United States Patent
Rombaut et al.

(10) Patent No.: US 8,640,650 B2
(45) Date of Patent: Feb. 4, 2014

(54) METHOD FOR TREATING ARTEMIA CYSTS

(75) Inventors: Geert Rombaut, Berlare (BE); Luciaan Alex Johan Van Nieuwenhove, Amphur Pakkred (TH); Eddy Marie Jules Naessens-Foucquaert, De Pinte (BE)

(73) Assignee: Inve Technologies N.V., Dendermonde (BE)

( * ) Notice: Subject to any disclaimer, the term of this patent is extended or adjusted under 35 U.S.C. 154(b) by 354 days.

(21) Appl. No.: 12/735,719

(22) PCT Filed: Feb. 11, 2009

(86) PCT No.: PCT/EP2009/051545
§ 371 (c)(1),
(2), (4) Date: Oct. 13, 2010

(87) PCT Pub. No.: WO2009/101095
PCT Pub. Date: Aug. 20, 2009

(65) Prior Publication Data
US 2011/0200704 A1   Aug. 18, 2011

(30) Foreign Application Priority Data
Feb. 13, 2008   (EP) .................................... 08151381

(51) Int. Cl.
*A01K 61/00*   (2006.01)

(52) U.S. Cl.
USPC .......................................... 119/206; 119/205

(58) Field of Classification Search
USPC ................. 119/204–206, 215–217, 236
See application file for complete search history.

(56) References Cited

U.S. PATENT DOCUMENTS

| | | | |
|---|---|---|---|
| 3,676,337 A * | 7/1972 | Kolm | 210/695 |
| 4,163,064 A | 7/1979 | Hill | |
| 4,679,559 A * | 7/1987 | Jefferts | 606/117 |
| 6,120,856 A * | 9/2000 | Liberti et al. | 427/550 |
| 6,277,298 B1 * | 8/2001 | Borduz et al. | 252/62.52 |
| 2006/0141636 A1 * | 6/2006 | Steggles et al. | 436/177 |
| 2009/0127203 A1 * | 5/2009 | Johnson et al. | 210/695 |
| 2009/0127204 A1 * | 5/2009 | Meier | 210/695 |
| 2009/0152210 A1 * | 6/2009 | Steggles et al. | 210/768 |
| 2012/0077206 A1 * | 3/2012 | Metzger et al. | 435/7.1 |
| 2012/0238003 A1 * | 9/2012 | Fukaya et al. | 435/261 |

FOREIGN PATENT DOCUMENTS

| | | |
|---|---|---|
| EP | 1 433 380 A1 | 6/2004 |
| GB | 1 600 832 A | 10/1981 |

OTHER PUBLICATIONS

Wikipedia, Immunomagnetic separation, Nov. 21, 2007, http://en.wikipedia.org/w/index.php?title=Immunomagnetic_separation&oldid=172911521, retrieved from internet:Dec. 18, 2012.*

(Continued)

*Primary Examiner* — Kristen C Hayes
(74) *Attorney, Agent, or Firm* — Sughrue Mion, PLLC

(57) ABSTRACT

Cysts, in particular *Artemia* cysts, are incubated the in a hatching medium so that a portion of the cysts hatch and release free swimming live food organisms. The free swimming live food organisms have subsequently to be separated from the cysts which have not hatched. Before incubating the cysts, magnetic particles are applied onto the cysts so that these cysts can be attracted magnetically, in particular in the liquid hatching medium. This enables to separate the unhatched cysts and the empty cyst shells, coated with the magnetic particles, effectively from the free swimming live food organisms which do not have magnetic particles applied onto their outer surface. The invention also relates to the coated cysts.

32 Claims, 1 Drawing Sheet

(56) References Cited

OTHER PUBLICATIONS

Safarik et al, Use of magnetic techniques for the isolation of cells, 1999, Journal of Chromatography B, 722, 33-53.*

Environmental Protection Agency, Method 1623: *Cryptosporidium* and *Giardia* in Water by Filtration/IMS/FA, Dec. 2005.*

Donald E. Campton et al., "Simple Procedure for Decapsulating and Hatching Cysts of Brine Shrimp (*Artemia* spp.)", The Progressive Fish-Culturist, Jan. 1989, pp. 176-179, vol. 51.

* cited by examiner

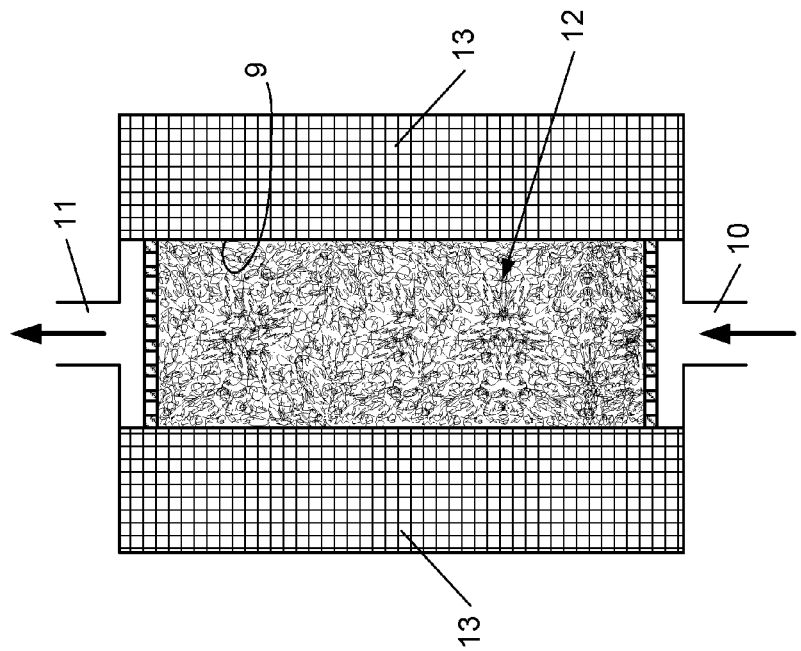
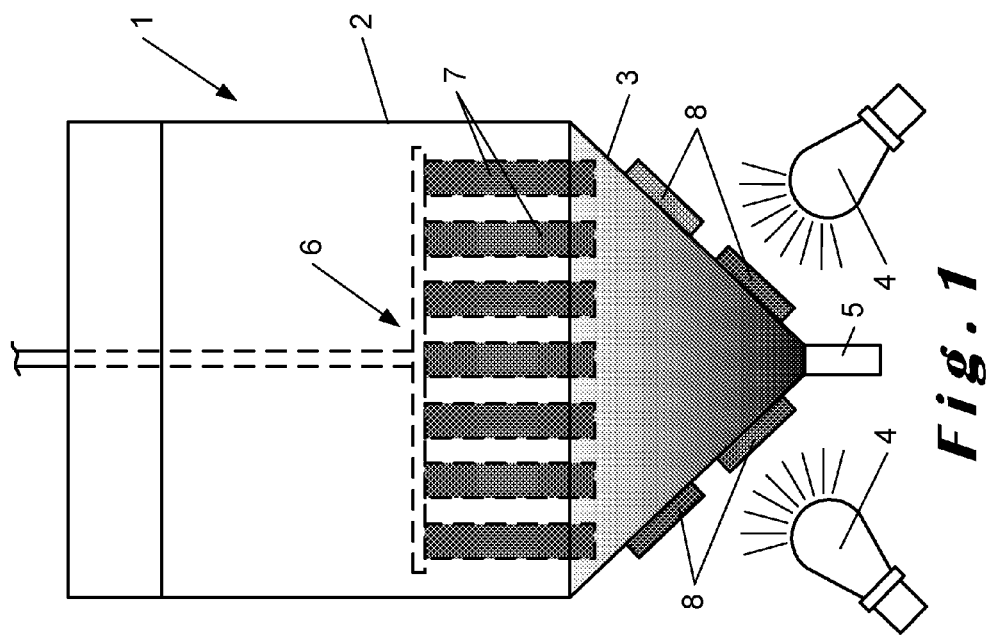

METHOD FOR TREATING ARTEMIA CYSTS

The present invention relates to a method for treating cysts, in particular *Artemia* cysts, which are intended to be incubated in a liquid hatching medium to produce live food organisms, in particular *Artemia* nauplii.

The production of the *Artemia* nauplii as a live food for fish and crustacean larvae is considered an essential operation in marine hatcheries. The production steps of the *Artemia* nauplii commonly include hatching, separation, enriching, rinsing and harvesting, while a sieve or concentrator/rinser is usually needed to harvest and rinse *Artemia* nauplii. A concentrator is actually a filter, which is used to separate waste water from the nauplii, to remove the excess water from the nauplii after hatching to a final volume suitable for distribution or storage and to wash out the oily coating on the nauplii after enrichment.

After hatching the *Artemia* nauplii need to be separated from the unhatched cysts and empty cyst shells, as these cysts and shells may cause big problems in the larval tanks. Indeed, when they are ingested by the predator, they can not be digested and may obstruct the gut so that the larval fish or other predator may die. Separation is achieved in most of the hatcheries by removing the aeration tube from the hatching tank, allowing the different objects (*Artemia* nauplii, full cysts and empty cyst shells) in the hatching tank to separate. *Artemia* nauplii swim freely in the hatching tank and may be collected at the bottom, in the tip of the hatching cone, using light (*Artemia* nauplii are attracted to the light source). On the other hand the empty cyst shells tend to float, while full unhatched *Artemia* cysts tend to sink. These latter objects may interfere with the quality of the *Artemia* nauplii after harvesting the hatched nauplii. When a lot of cysts (full or empty) are found among the hatched *Artemia* nauplii an extra separation step is needed to remove these cysts from the *Artemia* nauplii. Usually, a sieve is used to remove the cysts from the *Artemia* nauplii, by collecting the cysts on the sieve. The sieve is chosen in such a way that the nauplii can pass the sieve and that objects such as cysts are collected on the sieve. Overall the mesh size of the sieve is approximately 212 µm. The nauplii themselves are subsequently collected on a finer sieve. Usually, the double sieve method is used, a first sieve retaining the unhatched cysts, the second sieve the nauplii. This separation process based on the double sieve method is a delicate and time-consuming process.

Depending on the ratio cysts/*Artemia* nauplii in the concentrated *Artemia* in the tip of the hatching tank, this filtering step can be done efficiently or inefficiently. The more cysts are present, the faster the filtering screen clogs. Clogging will not only reduce the flow rate but will also increase the risk of damaging nauplii, and has therefore been recognized as a main problem to the hatching/separation process. To prevent clogging, the particles on the filtering screen must be effectively removed during filtration. In practice, a water jet is used to spray the nauplii through the filter. The filtering step should indeed be carried out rather quickly since the aeration of the hatching tank is usually stopped to allow the empty cyst shells to rise in the hatching tank and the nauplii to concentrate in the bottom part. Nauplii may not be allowed to settle for too long in the point of the conical container to prevent dying off due to oxygen depletion.

One of the solutions used in hatcheries to overcome the problem of having to separate the unhatched cysts from the nauplii is to decapsulate the *Artemia* cysts. Cyst decapsulation (=removal of the outer layer of the cyst shell from the *Artemia* embryo) is a well-known chemical process, developed in the '70. The classical decapsulation procedure consists in dissolving the cyst shells (chorion) with NaOCl (sodium hypochlorite) with an addition of NaOH (for maintaining a high pH) for a limited period. The outer cyst layer dissolves by oxidation. As soon as the exothermic reaction terminates, the de-shelled cysts need to be neutralized immediately with $Na_2S_2O_3$ to protect the embryos from oxidation. When the decapsulation process is carried out properly, the viability of the embryos is not affected and they can be hatched into nauplii or dehydrated for storage. Decapsulation of the cysts eliminates the need of separation of empty cyst shells and unhatched cysts. However unhatched decapsulated cysts will sink fast in fish or shrimp larval tanks and can decompose and deteriorate the culture medium, possibly causing bacterial infections and diseases.

Although most hatcheries apply this process, a major disadvantage of such a decapsulation process is that the waste water can contain very high levels of toxic products and is therefore very difficult to purify, e.g. the waste water can contain high levels of COD, Cl and AOX. Nowadays, it is impossible to carry out this process on a large scale due to environmental concerns that are raised for the disposal of such chemicals. Another drawback is that the decapsulation process requires quite a lot of labour and needs moreover to be carried out accurately since otherwise the viability of the cysts may be affected. Due to the exothermic reaction, the decapsulation medium has to be cooled and the decapsulation process should be stopped exactly at the right moment to avoid oxidation of the embryos themselves (see for example the SRAC Publication No. 702 of October 2000 *"Artemia Production for Marine Larval Fish Culture"* by Granvil D. Treece).

An object of the present invention is therefore to provide a new method enabling to separate unhatched cysts, and optionally also empty cyst shells, effectively from the free swimming live food organisms, in particular from the *Artemia* nauplii, with less risk of damaging or killing the free swimming live food organisms.

To this end, the method according to the invention is characterised in that it comprises the step of applying magnetic particles onto the cysts enabling to magnetically attract said cysts, in particular in said liquid hatching medium.

By the presence of the magnetic particles onto the cysts, but not onto the free swimming live food organisms which are hatched out off the cysts, the cysts can be attracted magnetically and can thus be separated effectively, without damaging the live food organisms, from these organisms. It is for example possible to apply a magnet in the hatching medium to attract the unhatched cysts and the empty cyst shells to remove these from the hatching medium, either by removing the magnet with the cysts and cyst shells adhering thereto from the hatching tank or by removing the hatching medium with the free swimming live food organisms from the hatching tank whilst keeping the magnet in the tank. In the latter case, the magnet can also be applied in or to the wall of the tank so that the unhatched cysts and empty cyst shells adhere to the wall of the tank. Alternatively or additionally, the hatching medium can also be led after the hatching step through a separator device, in particular a flow through device, containing a magnet withholding the unhatched cysts and any empty cyst shells.

By the term magnetic particles is meant particles which are capable of being attracted by a magnet. The particles can thus be made of a ferromagnetic, a ferrimagnetic or even a (strong) paramagnetic material. Particles made of a ferro- or a ferrimagnetic material can be magnetized, i.e. converted in small magnets. In that case, although it is still preferred to use magnets to attract the cysts or cyst shells, the magnets could be replaced by non-magnetized magnetic materials.

In a preferred embodiment of the method according to the invention the magnetic particles are applied in the form of a liquid suspension, in particular in the form of an aqueous suspension, onto the cysts, preferably when the cysts have a dry surface so that they are free flowing. In another embodiment, the magnetic particles are applied in the form of a powder onto the cysts. The term "free flowing" is intended to mean in the present specification that the cysts do not stick together in small clumps but exist as individuals that can be easily poured from a piece of paper.

It has been found that, even without any adhesive or adhesive coating on the magnetic particles, the magnetic particles adhere sufficiently to the cysts, and remain adhered thereto in the hatching medium, so that after the hatching the cysts and empty cyst shells can be separated by magnetic attraction from the free swimming live food organisms. An advantage of not having to use an adhesive is that it is much easier to prevent the cysts from clumping together. However, this does not exclude the possibility to use an adhesive in the method according to the invention. For example an adhesive, such as CMC (carboxymethyl cellulose), can be used which dissolves when the cysts are introduced in the hatching medium.

In a further preferred embodiment of the method according to the invention, before being applied onto the cysts, at least 90 wt % of the magnetic particles have a size smaller than 10 µm, preferable smaller than 5 µm, more preferably smaller than 1 µm and most preferably smaller than 0.5 µm.

An advantage of this embodiment is that such small particles adhere better to the cysts than larger particles. Once coated onto the cysts, the magnetic particles may form larger deposits (crystals) on the cysts which may in particular partially be due to magnetic attraction forces between the magnetic particles.

The invention also relates to cysts, in particular *Artemia* cysts, obtainable by the method according to the invention. These cysts are characterised in that they have magnetic particles applied onto their outer surface.

The invention finally also relates to a method for producing free swimming live food organisms starting cysts according to the invention wherein the cysts are incubated in a hatching medium so that a portion of the cysts hatch and release free swimming live food organisms and wherein the free swimming live food organisms are separated from the cysts which have not hatched and from the empty cyst shells. According to the invention, the unhatched cysts, having magnetic particles applied onto their outer surface, are separated after the incubation step by magnetic attraction from the free swimming live food organisms which do not have magnetic particles applied onto their outer surface.

Other particularities and advantages of the invention will become apparent from the following description of some particular embodiments of the methods and the cysts according to the present invention. The reference numerals used in this description relate to the annexed drawings wherein:

FIG. 1 shows schematically a hatching tank wherein a cyst removal device with magnets is arranged to separate, after hatching of the cysts, the unhatched cysts from the produced nauplii; and FIG. 2 shows, on a larger scale, an embodiment of a flow through device enabling to magnetically separate the unhatched cysts from the nauplii by leading the hatching medium, after the hatching step, through this device.

The present invention is intended to provide a new and advantageous method for separating unhatched cysts, and optionally also empty cyst shells, from the free swimming live food organisms which have hatched out off the cysts. The cysts are in particular *Artemia* cysts but the invention can also be applied to other types of cysts. The term cyst is moreover intended to embrace not only embryos which are enclosed in an outer shell and which can hatch relatively quickly (within one or a couple of days) but also to embrace eggs wherein the embryo has still to develop before it can hatch. The present invention is therefore for example also applicable to cysts (eggs) of other water animals like rotifers, fresh water *Artemia*, etc. The major application of the present invention is however *Artemia* cysts so that the further description will therefore be given only with reference to such *Artemia* cysts and to the free swimming nauplii that hatch out off *Artemia* cysts.

*Artemia* cysts are available in large quantities along the shorelines of hypersaline lakes, coastal lagoons and solar saltworks scattered over the five continents. After harvesting, the cysts are washed and stored in a brine solution for several months. Subsequently, after processing (wash/rinse with fresh water) they are dried to a water content below 15 wt. %. Upon incubation in seawater, these cysts release free-swimming nauplii that can directly be fed as a nutritious live food source to the larvae of a variety of marine as well as freshwater organisms, which makes them the most convenient, least labour-intensive live food available for aquaculture.

An example of a container 1 which can be used to hatch *Artemia* cysts is illustrated in FIG. 1. Best hatching results are achieved in practice in a container 1 which has a wall 2 forming a conical bottom 3 and which is aerated from the bottom. Cylindrical or square-bottomed tanks will have dead spots in which *Artemia* cysts and nauplii accumulate and suffer from oxygen depletion. Transparent or translucent containers will facilitate inspection of the hatching suspension, especially when harvesting. Moreover, the container 1 can be equipped with at least one light source 4, which is positioned at the conical bottom part to attract the nauplii towards the bottom before harvesting them.

After hatching of the cysts in the container 1, the aeration is stopped so that most of the unhatched cysts will settle onto the bottom 3 and most of the empty cyst shells will float onto the surface of the hatching medium. The container 1 is provided at the bottom with an outlet 5 so that the hatching medium containing the free swimming nauplii can be tapped off onto a sieve. In order to avoid having to sieve off the unhatched cysts from the hatching medium, or in order to reduce the amount of unhatched cysts which have to be sieved out off the hatching medium, a magnetic separation method is now used.

In accordance with the present invention, the cysts introduced in the hatching medium are provided with magnetic particles onto their outer surface. In this way, the unhatched cysts and the empty cyst shells can be separated by magnetic attraction from the free swimming nauplii which are hatched out off the cysts and which do not contain magnetic particles. This separation can be performed in different ways.

After the hatching step, a cyst removal device 6 comprising one or more magnets 7 can be lowered into the hatching medium so that the unhatched cysts and the empty cyst shells are attracted by this device 6 and stick to the magnets 7. In order to be able to remove also the unhatched cysts which were situated in the bottom part of the container, the hatching medium can be circulated from the bottom of the container towards the top thereof. In this way, less unhatched cysts will arrive onto the cyst sieve so that, when the magnetic separation is sufficiently efficient, it is no longer necessary to sieve any unhatched cysts out off the hatching medium.

Instead of lowering a cyst removal device 6 into the hatching container, or in addition thereto, it is also possible to provide the wall of the hatching container 1, in particular the conical bottom 3 thereof, with one or more magnets 8. In this way, when emptying the container 1 through the outlet 5, the unhatched cysts and the empty cyst shells will stick to the wall of the container 1 at the location of the magnets 8.

During the incubation of the cysts in the hatching medium, the magnets 8 should preferably be removed so that the cysts are more uniformly distributed in the hatching medium by the air blown therein. When the magnets 8 are no permanent magnets but instead electromagnets 8, the electric current can also be interrupted instead of removing the magnets. The magnets 7 of the cyst removal device 6 which is lowered into the hatching medium may also be electromagnets but are preferably permanent magnets in order to reduce electrical hazard.

Instead of, or in addition to, separating the unhatched cysts magnetically in the hatching container itself, the unhatched cysts and empty cyst shells can be separated from the nauplii in a flow through device wherein the hatching medium is guided along at least one magnet so that the unhatched cysts and any empty cyst shells stick to the magnet while the nauplii are not attracted and pass the magnet. An example of such a flow through device is illustrated schematically in FIG. 2. It comprises an elongated chamber 9 having an inlet 10 and an outlet 11. The elongated chamber 9 is filled with steel wool 12 of magnetic grade stainless steel (or another corrosion resistant ferromagnetic wool) and is surrounded by an electrical coil 13 so that a magnetic field can be generated in the elongated chamber 9. The steel wool 12 can thus be magnetized so that it forms magnets attracting the unhatched cysts or empty cyst shells loaded with the magnetic particles. Due to the large surface area of the steel wool 12, a large surface is available for retaining the unhatched cysts or empty cyst shells so that the flow through device can be made quite compact. Further details about such a magnetic separation device can be found in U.S. Pat. No. 3,676,337, which is incorporated herein by way of reference.

As described here above, an essential feature of the present invention is that the cysts are provided with magnetic particles onto their outer surface. The present inventors have found that by applying magnetic particles onto the cysts, unhatched cysts and empty cyst shells cannot only be separated efficiently from the produced nauplii but importantly that the cysts can also be coated in a cost effective manner with the required amount of magnetic particles.

The magnetic particles can be applied in the form of a powder onto the cysts. In this case, the cysts have preferably a wet surface (are not free flowing) when applying the powder thereon so that the magnetic particles adhere better to the cysts. The powder can in particular be applied onto the cysts after having removed the cysts out of the brine solution, but before drying them, so that they still have a wet surface. In this way, the cysts have to be dried only once, in particular to a water content of less than 25 wt. %, preferably to a water content of less than 20 wt. % and more preferably to a water content of less than 15 wt. %.

Since a liquid suspension can more easily be applied, the magnetic particles are preferably applied onto the cysts in the form of an liquid suspension. The magnetic particles can be suspended in an organic solvent, for example into a vegetable oil or into ethanol, but they are preferably suspended into an aqueous medium to achieve an aqueous suspension. This suspension can be applied, in particular sprayed, as described here above onto the wet cysts before drying them to the above described water contents or it can be sprayed onto the dried, free flowing cysts. When using an aqueous suspension, the surface of the dried cysts becomes wet but the water is rather quickly absorbed by the dry cysts so that when stirring the cysts they become quickly free flowing again. When the cysts are sufficiently dry, and when a sufficiently small amount of aqueous suspension is used, the (internal) water content of the treated cyst may remain below 25 wt. %, preferably below 20 wt. % or even below 15 wt. %. However, after having applied the aqueous suspension, the cysts can be dried again to achieve such low water contents. An advantage of such low water contents is that, after having applied the magnetic particles, the cysts can be packed and stored as usual for several months before use. A further advantage of drying the cysts again is that the magnetic particles adhere apparently more strongly to the cysts as the magnetic separation was more effective when drying the cysts first before introducing them into the hatching medium.

Instead of applying preformed magnetic particles onto the cysts, the magnetic particles can also be formed in situ onto the cysts, for example in the form of a coating. A coating of magnetic material is also to be considered in the present specification and claims as being magnetic particles which are applied onto the cysts since the coating, even when continuous, has nevertheless to be rather brittle and be able to break easily into magnetic particles to enable hatching of the cysts. As described in WO 04/057952 the shells of the cysts can react with permanganate (in particular with potassium permanganate) to produce a manganese dioxide layer on the cysts. In WO 04/057952 this manganese dioxide layer was subsequently removed to produce decapsulated cysts but in accordance with the present invention, the manganese dioxide layer does not have to be removed but can be used to separate the cysts and cyst shells magnetically from the produced nauplii.

The magnetic particles can be made of ferromagnetic, ferrimagnetic or even of paramagnetic materials. Ferromagnetic materials and ferrimagnetic materials are however preferred since they need smaller magnetic fields to achieve the required magnetic forces for separating the cysts and cyst shells from the nauplii. The magnetic particles comprise preferably an oxide of one or more transition metals, in particular one or more oxides selected from the group consisting of $CrO_2$ (chromium (IV) oxide), $CoFe_2O_4$ (cobalt ferrite), $CuFe_2O_4$ (copper ferrite), $Dy_3Fe_5O_{12}$ (dysprosium ferrogarnet), $DyFeO_3$ (dysprosium orthoferrite), $ErFeO_3$ (erbium orthoferrite), $Fe_5Gd_3O_{12}$ (gadolinium ferrogarnet), $Fe_5Ho_3O_{12}$ (holmium iron garnet), $FeMnNiO_4$ (iron nickel manganese oxide), $Fe_2O_3$ (maghemite), $Fe_3O_4$ (magnetite), $Fe_2O_3$ (hematite), $FeLaO_3$ (lanthanum ferrite), $MgFe_2O_4$ (magnesium ferrite), $Fe_2MnO_4$ (manganese ferrite), $MnO_2$ (manganese dioxide), $Nd_2O_7Ti_2$ (neodymium dititanate), $Al_{0.2}Fe_{1.8}NiO_4$ (aluminum nickel ferrite), $Fe_2Ni_{0.5}O_4Zn_{0.5}$ (nickel-zinc ferrite), $Fe_2NiO_{0.4}Zn_{0.6}$ (nickel zinc ferrite), $Fe_2Ni_{0.8}O_4Zn_{0.2}$ (nickel zinc ferrite), $NiO$ (nickel (II) oxide), $Fe_2NiO_4$ (nickel ferrite), $Fe_5O_{12}Sm_3$ (samarium ferrogarnet), $Ag_{0.5}Fe_{12}La_{0.5}O_{19}$ (silver lanthan ferrite), $Fe_5O_{12}Y_3$ (yttrium iron garnet), and $FeO_3Y$ (yttrium orthoferrite). The magnetic particles preferably comprise $Fe_2O_3$ (hematite or magnemite), $MnO_2$ (manganese dioxide) or a ferrite, preferably $Fe_3O_4$ (magnetite). Magnetite is the most preferred in view of its strong magnetic properties.

Before being applied onto the cysts, the magnetic particles used to coat the cysts are preferably so small that at least 90 wt % of them have a size smaller than 10 μm, preferably smaller than 5 μm, more preferably smaller than 1 μm and most preferably smaller than 0.5 μm. The smaller the particles, the better they adhere to the cysts without having to use an adhesive. Moreover, smaller particles result in a more stable suspension, especially when no stabilizer (surfactant) is used to prepare the suspension. After the magnetic particles are applied onto the cysts, they may have a larger size. On microscopic views of the coated cysts, it can indeed be seen that the magnetic particles have clumped together on the surface of the cysts to form larger clumps/crystals. This may be possibly be explained by the fact that the water is withdrawn from the suspension so that larger crystals are formed but especially also by the fact that the magnetic particles may attract one another magnetically to form larger clusters/clumps.

The powder of magnetic material can be made by grinding the magnetic material. This powder can subsequently be mixed with water to achieve an aqueous suspension. A drawback of such a grinding method is that it takes quite a long time to achieve a fine powder and that the particle size is not very uniform. Moreover, it is difficult to achieve very small particle sizes.

In practice there exist so-called ferrofluids which can be defined as being stable colloidal suspensions of ferromagnetic or ferrimagnetic particles. As described in U.S. Pat. No. 4,329,241 such ferrofluids can be made by grinding for example ferrite for several weeks in the presence of kerosene or oleic acid until the particles are small enough (in the order of magnitude of 10 nm) to permit stabilization of the suspension by Brownian movement. Such a process is however quite expensive. A cheaper method consists in the precipitation of colloidal magnetite by reacting solutions of ferrous and ferric salts with alkaline substances such as sodium hydroxide or an ammonia solution. The particle size can be controlled by stirring. When stirring sufficiently vigorous, the particles size may even be smaller than 10 nm. To achieve a stable ferrofluid, a coating of a suspending agent can be applied onto the magnetic particles. Methods for producing such ferrofluids are disclosed for example in U.S. Pat. No. 4,329,241, U.S. Pat. No. 4,906,382, U.S. Pat. No. 5,240,626, U.S. Pat. No. 6,120,856, U.S. Pat. No. 6,277,298, U.S. Pat. No. 6,068,785 and WO 91/02083.

In the method according to the present invention, it is possible to use such stable ferrofluids to apply the magnetic particles onto the cysts. However, it has been found that also cheaper suspensions can be used namely suspensions which are made without the use of any dispersing agent and which are not stable but settle within some minutes. A suspension of magnetite particles can easily be made as described hereabove by allowing ferrous and ferric salts to react under alkaline conditions in an aqueous medium so that magnetite particles are formed, the size of which can be controlled by stirring the aqueous medium. This suspension can be sprayed onto the cysts, in particular onto dry cysts. It has been found that notwithstanding the fact that the magnetic particles are not coated with a surfactant, or with specific binding substances as disclosed in WO 91/02083, they adhered sufficiently well to the cysts. The method according to the invention can thus be carried out with cheap materials and in a relatively simple way so that it enables to turn in particular cysts of lower quality (high separation percentage as determined by the general separation method described hereunder but without the use of a magnet) into a valuable product. The treatment according to the present invention enables indeed to remove the unhatched cysts easily from the nauplii which are used as live food organisms.

The magnetic particles are preferably applied onto the cysts in an amount of at least 0.75, preferably of at least 1.0, more preferably of at least 1.5 and most preferably of at least 2.0 mg/g cyst dry matter. Tests have shown that with such amounts the unhatched cysts can be effectively attracted and thus separated from the nauplii by means of a magnet. The amount of magnetic particles applied onto the cysts is preferably lower than 200, more preferably lower than 100 and most preferably lower than 50 mg/g cyst dry matter. In practice, the cysts could even be attracted effectively when this amount of magnetic particles was lower than 20 and in particular even lower than 15 mg/g cyst dry matter.

An aqueous suspension of magnetite particles prepared by allowing ferrous chloride ($FeCl_2.4H_2O$) and ferric chloride ($FeCl_3.6H_2O$) to react with one another in the presence of sodium hydroxide (NaOH) can result, when using saturated solutions, in a suspension containing about 100 g/l magnetite particles. When spraying and/or mixing such a suspension onto dry cysts, it is immediately absorbed by the cysts. The water content of the cysts rises thus, but only to a limited extent, for example from 10% to 20%, so that the cysts remain dormant and can thus be stored. For prolonged storage, the cysts are preferably dried again. The produced suspension can easily be concentrated by allowing the magnetic particles to settle and by removing a portion of the supernatant liquid. The concentration of magnetic particles is kept however preferably below 200 g/l, more preferably below 150 g/l to enable to spray the suspension easily onto the cysts. The concentration of magnetic particles in the suspension applied onto the cysts is preferably higher than 5 g/l, more preferably higher than 10 g/l and most preferably higher than 20 g/l to limit the increase of the water content of the treated cysts.

EXAMPLES

All reagents and chemicals used in these experiments were of analytical grade and obtained from Sigma Aldrich (Belgium). Magnetite suspension (MS) was prepared by mixing Ferrous chloride tetrahydrate ($FeCl_2.4H_2O$), Ferric chloride hexahydrate ($FeCl_3.6H_2O$), sodium hydroxide (NaOH) and water at a ratio of 1:2:2:10 while/with stirring. This mixture resulted in the formation of suspended $Fe_3O_4$ nanoparticles. The preparation so made contained approximately 0.1 g $Fe_3O_4$/ml.

Magnetite powder (Iron (II, III) oxide, Sigma Aldrich, powder <5 μm) (MP) was suspended in water before it was coated on the cysts.

To coat magnetite particles by the method of this invention, 5 ml aliquots of various concentrations of various coating materials (MS and MP) were mixed with 50 g of different cysts types (moisture content of the cysts was ±10%). A positive coating result was apparent from visual inspection of the cysts.

One liter cones were used in which 2 g of *Artemia* cysts were incubated in artificial seawater (25 g/L) for preferably (but not limited to) 24 hours. The temperature of the water in the cones was kept constant around 30° C., the water was constantly aerated and illuminated. The criterion used to determine if the cysts were coated sufficiently was to determine the amount of cysts and cyst shells relative to the total amount of cysts, cyst shells, umbrella and hatched nauplii. Further on in the text, this number is presented as 'Separation percentage'.

To determine the separation percentage, magnets were suspended in the hatching medium, in a 1 L cone at approximately 5 cm from the bottom of the cone (=at the 20-30 ml mark). Aeration was stopped and the aeration tube was removed. After 30 seconds, 30 ml of the hatching medium, containing *Artemia* nauplii, umbrella, unhatched cysts and empty cyst shells is collected and transferred back to the hatching cone using a siphon which was put at the bottom of the hatching cone. After 2 minutes by which time magnetic material had collected on the magnets, another 200 ml hatching medium was removed by using the siphon and transferred to a new recipient. Subsequently, 800 ml of artificial seawater was added to the new cone to increase the volume up to 1 liter. Samples were taken to determine the separation percentage.

The dose effect of MS and MP on the separation percentage is illustrated in Table 1 and 2. Different doses of magnetite were coated on cysts of batch 1 (Table 1) and batch 2 (Table 2) according to the method of the invention as a MS or MP solution. Each treatment was evaluated in triplicate with the treatment's result being the average of the triplicates. From Table 1 it appears that, in this example, coating of cysts of batch 1 with 4.5 mg $Fe_3O_4$/g cysts dry weight of MS gave the lowest separation percentage of 4%, the separation percentage of untreated cysts was 22%.

More important, at a concentration of 1.5 mg $Fe_3O_4$/g cysts, the separation percentage already decreases considerably to 14%. At concentrations of 3 mg $Fe_3O_4$/g cysts, the separation percentage appears to be lower than 7% and this stays under 7% when larger amounts of MS are introduced. More important, at a concentration higher than 4.5 mg $Fe_3O_4$/g cyst dry weight using MS to coat the cysts, the separation percentage did not decrease any more.

In the case of MP, there was a clear improvement of the separation percentage, starting from 22% to a minimum of 8%. For batch 1, a minimum separation percentage of 8% was reached when cysts were coated with 7.8 mg $Fe_3O_4$/g cyst dry weight. More important, at a concentration of 4.4 mg Fe3O4/g cysts, the separation percentage already decreases considerably to 15%. For batch 2 the starting separation percentage was 8% to 10%. This separation percentage is improved to a minimum of 1% to 0% with the addition of MS and MP. However, with the addition of MP a lot of the magnetite particles were not completely attached to the cysts and were released into the hatching medium during hatching.

Table 3 illustrates the effect of drying of the coated cysts on the separation percentage of cysts coated with MS. Cysts of batch 1, coated according to the methodology of the invention, were dried to their original moisture content of 10%. The separation percentage of both samples, i.e. before drying (20% moisture content) and after drying (10% moisture content) was measured. Apparently, it was possible to improve the separation percentage of cysts coated with $Fe_3O_4$ by drying the cysts. It was noticed that cysts coated with $Fe_3O_4$ and subsequently dried were attracted much faster by the magnets hung in the hatching medium then the coated cysts which were not dried.

TABLE 1

Dose effect of MS and MP after coating on cysts of batch 1 on the separation percentage

| Cysts | Magnetite suspension | mg $Fe_3O_4$/g cysts dry weight | Separation Percentage |
|---|---|---|---|
| Batch 1 | MS | 0.00 mg | 22% |
| Batch 1 | MS | 0.75 mg | 19% |
| Batch 1 | MS | 1.50 mg | 14% |
| Batch 1 | MS | 3.00 mg | 6% |
| Batch 1 | MS | 4.00 mg | 7% |
| Batch 1 | MS | 4.50 mg | 4% |

TABLE 1-continued

Dose effect of MS and MP after coating on cysts of batch 1 on the separation percentage

| Cysts | Magnetite suspension | mg $Fe_3O_4$/g cysts dry weight | Separation Percentage |
|---|---|---|---|
| Batch 1 | MS | 6.00 mg | 4% |
| Batch 1 | MS | 7.50 mg | 5% |
| Batch 1 | MS | 10.00 mg | 6% |
| Batch 1 | MS | 12.50 mg | 6% |
| Batch 1 | MP | 0.00 mg | 22% |
| Batch 1 | MP | 4.40 mg | 15% |
| Batch 1 | MP | 6.00 mg | 10% |
| Batch 1 | MP | 7.80 mg | 8% |

TABLE 2

Dose effect of MS and MP after coating on cysts of batch 2 on the separation percentage

| Cysts | Magnetite suspension | mg $Fe_3O_4$/g cysts dry weight | Separation Percentage |
|---|---|---|---|
| Batch 2 | MS | 0.00 mg | 8% |
| Batch 2 | MS | 7.50 mg | 1% |
| Batch 2 | MS | 10.00 mg | 1% |
| Batch 2 | MS | 12.50 mg | 1% |
| Batch 2 | MP | 0.00 mg | 10% |
| Batch 2 | MP | 5.80 mg | 1% |
| Batch 2 | MP | 6.10 mg | 1% |
| Batch 2 | MP | 7.30 mg | 0% |
| Batch 2 | MP | 7.60 mg | 1% |

TABLE 3

Effect of drying on the separation percentage of cysts of batch 1 coated with MS

| Cysts | Magnetite suspension | mg $Fe_3O_4$/g cysts | Separation | Water content |
|---|---|---|---|---|
| Batch 1 | MS | 0 mg | 22% | 10% |
| Batch 1 | MS | 10 mg | 6% | 20% |
| Batch 1 | MS | 10 mg | 0.4% | 10% |

The invention claimed is:

1. A method for treating harvested cysts, which are intended to be incubated in a liquid hatching medium to produce live food organisms, wherein the method comprises the step of applying magnetic particles onto the cysts in an amount of at least 0.75 mg/g cyst dry matter such that said cysts can be magnetically attracted by a magnet.

2. A method according to claim 1, wherein said magnetic particles are applied in the form of a liquid suspension onto said cysts.

3. A method according to claim 1, wherein said magnetic particles are applied in the form of a powder onto said cysts.

4. A method according to claim 1, wherein after having applied said magnetic particles onto said cysts, said cysts have a water content or are dried to a water content of less than 25 wt. %.

5. A method according to claim 1, wherein, before being applied onto said cysts, at least 90 wt % of said magnetic particles have a size smaller than 10 μm.

6. A method according to claim 1, wherein said magnetic particles comprise a ferromagnetic, a ferrimagnetic or a paramagnetic material.

7. A method according to claim 1, wherein said cysts are *Artemia* cysts.

8. A method according to claim 1, wherein said magnetic particles are applied in the form of an aqueous suspension onto said cysts.

9. A method according to claim 1, wherein said magnetic particles are applied in the form of a liquid suspension onto said cysts, when said cysts have a dry surface so that they are free flowing.

10. A method according to claim 1, wherein, after having applied said magnetic particles onto said cysts, said cysts have a water content or are dried to a water content of less than 20 wt. %.

11. A method according to claim 1, wherein, after having applied said magnetic particles onto said cysts, said cysts have a water content or are dried to a water content of less than 15 wt. %.

12. A method according to claim 1, wherein, before being applied onto said cysts, at least 90 wt % of said magnetic particles have a size smaller than 5 µm.

13. A method according to claim 1, wherein before being applied onto said cysts, at least 90 wt % of said magnetic particles have a size smaller than 1 µm.

14. A method according to claim 1, wherein before being applied onto said cysts, at least 90 wt % of said magnetic particles, have a size smaller than 0.5 µm.

15. A method according to claim 1, wherein said magnetic particles comprise an oxide of one or more transition metals or a ferrite.

16. A method according to claim 15, wherein said transition metal is $Fe_2O_3$ (hematite or magnemite) or $MnO_2$ (manganese dioxide).

17. A method according to claim 15, wherein said ferrite is $Fe_3O_4$ (magnetite).

18. Harvested cysts, wherein said cysts have magnetic particles applied onto their outer surface in an amount of at least 0.75 mg/g cyst dry matter.

19. Harvested cysts according to claim 18, wherein said magnetic particles comprise a ferromagnetic, a ferrimagnetic or a paramagnetic material.

20. Harvested csyts according to claim 18, which are *Artemia* cysts.

21. Harvested csyts according to claim 18, wherein said amount of magnetic particles applied onto the outer surface of the csyts comprises of at least 1 mg/g cyst dry matter.

22. Harvested csyts according to claim 18, wherein the amount of said magnetic particles applied onto the outer surface of the cysts comprises of at least 1.5 mg/g cyst dry matter.

23. Harvested cysts according to claim 18, wherein the amount of magnetic particles applied onto the outer surface of the cysts comprises at least 2 mg/g cyst dry matter.

24. Harvested cysts according to claim 18, wherein said magnetic particles comprise an oxide of one or more transition metals or a ferrite.

25. Harvested cysts according to claim 24, wherein said transition metal is $Fe_2O_3$ (hematite or magnemite) or $MnO_2$ (manganese dioxide).

26. Harvested cysts according to claim 24, wherein said ferrite is $Fe_3O_4$ (magnetite).

27. A method for producing free swimming live food organisms starting from cysts according to claim 18, which method comprises the step of incubating said cysts in a hatching medium so that a portion of said cysts hatch and release free swimming live food organisms which do not have magnetic particles applied onto their outer surface whilst another portion of said cysts are unhatched cysts which did not hatch and which have magnetic particles applied onto their outer surface and the step of separating said free swimming live food organisms by magnetic attraction from said unhatched cysts.

28. A method according to claim 27, wherein said cysts are incubated in a hatching container wherein at least one magnet is arranged to separate said unhatched cysts from said free swimming live food organisms.

29. A method according to claim 27, wherein said cysts are incubated in a hatching container having a wall which is provided with at least one magnet to magnetically attract said unhatched cysts towards the wall of the container.

30. A method according to claim 27, wherein after the incubation step at least a portion of the hatching medium, which contains free swimming live food organisms and unhatched cysts, is removed from the hatching container and is guided along at least one magnet so that unhatched cysts stick to said magnet while the free swimming live food organisms pass said magnet.

31. A method for treating harvested cysts, which are intended to be incubated in a liquid hatching medium to produce live food organisms, wherein the method comprises the step of applying magnetic particles in the form of a powder onto the cysts such that said cysts can be magnetically attracted by a magnet.

32. A method for treating cysts, which are intended to be incubated in a liquid hatching medium to produce live food organisms, wherein the method comprises the step of applying magnetic particles onto the cysts such that said cysts can be magnetically attracted by a magnet and wherein after having applied said magnetic particles onto said cysts, said cysts have a water content or are dried to a water content of less than 25 wt. %.

* * * * *